(12) United States Patent
Lin et al.

(10) Patent No.: US 11,247,750 B2
(45) Date of Patent: Feb. 15, 2022

(54) INFLATABLE PADDLE BOARD

(71) Applicant: WEIHAI CHUANGYI YACHT CO. LTD., Weihai (CN)

(72) Inventors: Peng Lin, Weihai (CN); Xiaojie Gong, Weihai (CN); Leqiang Lin, Weihai (CN)

(73) Assignee: WEIHAI CHUANGYI YACHT CO. LTD., Weihai (CN)

( * ) Notice: Subject to any disclaimer, the term of this patent is extended or adjusted under 35 U.S.C. 154(b) by 0 days.

(21) Appl. No.: 16/517,430

(22) Filed: Jul. 19, 2019

(65) Prior Publication Data
US 2020/0148306 A1 May 14, 2020

(30) Foreign Application Priority Data

Nov. 13, 2018 (CN) .......................... 201811373674.0

(51) Int. Cl.
*B63B 7/08* (2020.01)
*G01L 17/00* (2006.01)

(52) U.S. Cl.
CPC ................ *B63B 7/08* (2013.01); *B63B 7/085* (2013.01); *G01L 17/00* (2013.01)

(58) Field of Classification Search
CPC ........... B63B 32/51; B63B 7/08; B63B 34/22; B63B 7/085; B63B 34/26; B63B 34/52; G01L 17/00
See application file for complete search history.

(56) References Cited

U.S. PATENT DOCUMENTS

| 6,199,823 B1 * | 3/2001 | Dahlgren | ............ F16K 31/0651 |
| | | | 251/117 |
| 2019/0204175 A1 * | 7/2019 | Cegnar | .................... B63B 71/00 |
| 2020/0031434 A1 * | 1/2020 | Pouchkarev | ............ B63B 32/60 |

* cited by examiner

*Primary Examiner* — Andrew Polay
(74) *Attorney, Agent, or Firm* — Buchanan Ingersoll & Rooney PC

(57) ABSTRACT

The present invention provides an inflatable paddle board including an inflatable paddle board body, an air pressure detection device, and an air pressure display device, where the air pressure detection device is configured to detect air pressure in an air chamber of the inflatable paddle board body and transmit detected air pressure information; and the air pressure display device is configured to receive and display the air pressure information. The inflatable paddle board provided by the present invention enables a user to know the air pressure of the inflatable paddle board at any time, so that the abnormal situation of the air pressure of the inflatable paddle board can be found in time and a response can be made, and the inflatable paddle board has high safety.

10 Claims, 5 Drawing Sheets

INFLATABLE PADDLE BOARD

CROSS-REFERENCE TO RELATED APPLICATIONS

This application claims priority to Chinese Patent Application No. 201811373674.0 with a filing date of Nov. 13, 2018. The content of the aforementioned application, including any intervening amendments thereto, are incorporated herein by reference.

TECHNICAL FIELD

The present invention relates to a water sports apparatus, and more particularly to an inflatable paddle board.

BACKGROUND

An inflatable paddle board is a common water sports apparatus. Compared with a hard paddle board, the inflatable paddle board has the advantages of being foldable when deflated and facilitating transportation and storage, and thus is more and more popular among water sports enthusiasts. The air pressure is very important for the inflatable paddle board. During the inflation process, the air pressure in the inflatable paddle board must be strictly set as required to reach a preset value. If the preset value is not reached, that is, the inflatable paddle board is not inflated sufficiently, the hardness of the inflatable paddle board is insufficient, which will affects the user experience; if the air pressure exceeds the preset value, that is, overinflation occurs, the inflatable paddle board will deform or even burst, which affects the service life of the inflatable paddle board. In addition, during the use of the inflatable paddle board, if the inflatable paddle board leaks air slowly, a user often cannot immediately detect this situation, and the user is already in danger when detecting the air leakage; or the air pressure of the inflatable paddle board is the preset value during the inflation, but after exposure to sunlight, the air pressure rises with the increase of the temperature, which makes the inflatable paddle board have a safety hazard of burst. Especially in long-distance paddling, the air pressure of the inflatable paddle board is more important.

It is convenient to solve the air pressure control problem during the inflation of the inflatable paddle board, and the user often uses an inflation device with a pressure meter when inflating the inflatable paddle board to control the pressure of the inflatable paddle board. However, the user cannot learn about the pressure of the inflatable paddle board at any time when using the inflatable paddle board, and thus the hidden danger that the user cannot detect the situation in which the inflatable paddle board leaks air or the pressure is too high cannot be avoided.

Therefore, how to provide an inflatable paddle board enabling the user to know the pressure information at any time has become an urgent technical problem to be solved in the industry.

SUMMARY

An objective of the present invention is to provide an inflatable paddle board to overcome the deficiencies in the prior art.

To achieve the above objective, the technical solution of the present invention is as follows:

an embodiment of the present invention discloses an inflatable paddle board including an inflatable paddle board body, an air pressure detection device, and an air pressure display device, where the air pressure detection device is configured to detect air pressure in an air chamber of the inflatable paddle board body and transmit detected air pressure information; the air pressure detection device includes a casing embedded in an open hole of the inflatable paddle board body, and an accommodating cavity is formed in the casing; the periphery of the casing is in sealing and connection with the inflatable paddle board body, and a portion of the casing extending into the air chamber is provided with a plurality of through holes; an air pressure sensitive element configured to sense the air pressure is fixedly disposed in the accommodating cavity, and a ventilation pipe connected with the through holes and the air pressure sensitive element is also disposed in the accommodating cavity, to form a channel for guiding gas in the air chamber to the air pressure sensitive element; and the air pressure display device is configured to receive and display the air pressure information detected by the air pressure detection device.

In a preferred embodiment of the present invention, the air pressure display device is mechanically connected with the air pressure detection device; the air pressure detection device and the air pressure display device form an integrated mechanical air pressure meter; the air pressure sensitive element is an internal structure of the integrated mechanical air pressure meter, and a dial plate of the integrated mechanical air pressure meter is exposed out of the casing and is in sealing and connection with the casing.

In another preferred embodiment of the present invention, the air pressure display device includes a receiving module and a display screen; the air pressure sensitive element is an air pressure sensor, and the receiving module is configured to establish a communication connection with the air pressure sensor.

Further, the communication connection between the receiving module and the air pressure sensor is a wired connection; the receiving module and the display screen are disposed in the accommodating cavity, and the display screen is exposed out of the upper surface of the casing and is in sealing and connection with the casing.

Further, the communication connection between the receiving module and the air pressure sensor is a wireless connection; and the air pressure display device and the air pressure detection device are in split type arrangement.

Further, the air pressure display device is a mobile phone or a smart watch.

In a further preferred embodiment of the present invention, the casing includes an upper casing and a lower casing, and the accommodating cavity is formed in the upper casing; one end of the lower casing is open and sleeves the upper casing; the lower surface of the edge of the upper casing and the upper surface of the open edge of the lower casing are oppositely provided with step-shaped structure meshing with each other; the edges of both the upper casing and the lower casing are matched with each other to clamp a material piece around the open hole; the periphery of the edge of the upper casing is in sealing and connection with the inflatable paddle board body; the upper casing and the lower casing are fixedly connected with each other through an internal thread disposed on the lower portion of the upper casing and an external thread correspondingly disposed on the lower casing, and the plurality of through holes are disposed around or at the bottom of the lower casing.

Further, a sealing gasket is also disposed between the upper casing and the lower casing.

Further, the through holes are correspondingly provided with filter screens.

Further, the inflatable paddle board is made of a wire drawing material.

The advantages of the present invention over the prior art are as follows:

1) The inflatable paddle board provided by the present invention is provided with the air pressure detection device and the air pressure display device, which enables a user to grasp the pressure condition of the inflatable paddle board at any time, thereby avoiding the hidden danger that the inflatable paddle board leaks air or has too large pressure but the situation cannot be detected, and improving the safety of the use of the inflatable paddle board.

2) Preferably, the air pressure detection device and the air pressure display device of the inflatable paddle board provided by the present invention form the integrated mechanical air pressure meter, and the structure is simple and compact; and a measurement result is reliable.

3) Preferably, the air pressure detection device and the air pressure display device of the inflatable paddle board provided by the present invention are in wired connection, and the structure is similar to that of the integrated mechanical air pressure meter and has similar advantages.

4) Preferably, the air pressure detection device and the air pressure display device of the inflatable paddle board provided by the present invention are in wireless connection; the air pressure display device can be fixed at an easily-identified position of the inflatable paddle board and may also be worn on the body of the user; and for example, when the air pressure display device is the mobile phone or the smart watch, the user can carry and watch the air pressure display device conveniently.

5) Preferably, the casing of the inflatable paddle board provided by the present invention is in the form of a combined installation of the upper casing and the lower casing; the lower surface of the edge of the upper casing and the upper surface of the open edge of the lower casing are oppositely provided with step-shaped structure meshing with each other, so that the accommodating cavity is provided with a first sealing barrier for sealing and connection between the upper casing and the inflatable paddle board body, and the sealing gasket disposed between the upper casing and the lower casing is a second sealing barrier of the accommodating cavity. The two sealing barriers can effectively ensure the sealing effect of the accommodating cavity, so that devices in the accommodating cavity can operate normally.

6) Preferably, the through holes of the inflatable paddle board provided by the present invention are correspondingly provided with the filter screens, which can prevent foreign matter such as dust and wire drawing fibers in the inflatable paddle board from entering the air pressure detection device and affecting the measurement accuracy.

BRIEF DESCRIPTION OF DRAWINGS

In order to explain technical solutions of the present invention more clearly, the accompanying drawings used in the description of the embodiments will be briefly introduced below.

DESCRIPTION OF EMBODIMENTS

The technical solutions in the embodiments of the present invention are clearly and completely described in the following with reference to the accompanying drawings in the embodiments of the present invention.

Figure 1:
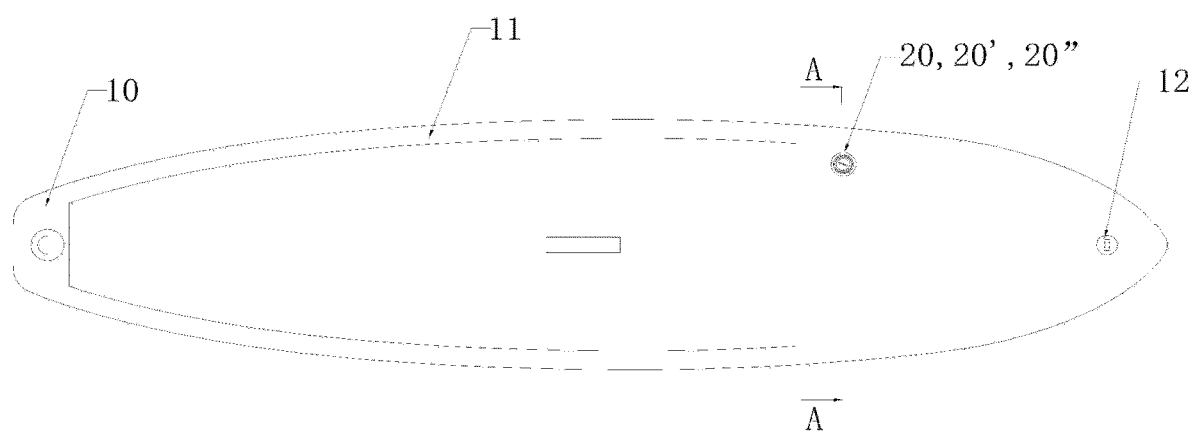
FIG. 1 is a vertical view of an inflatable paddle board disclosed by Embodiments 1 to 3 of the present invention.
Figure 2:
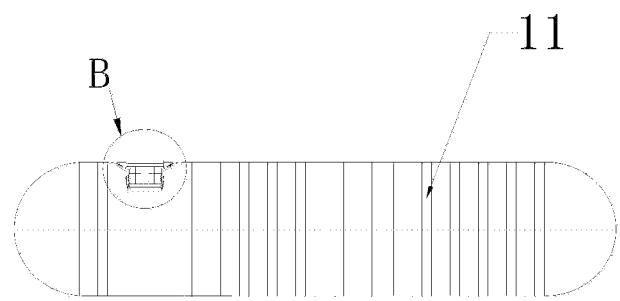
FIG. 2 is an A-A cut-open view in FIG. 1.
Figure 3:
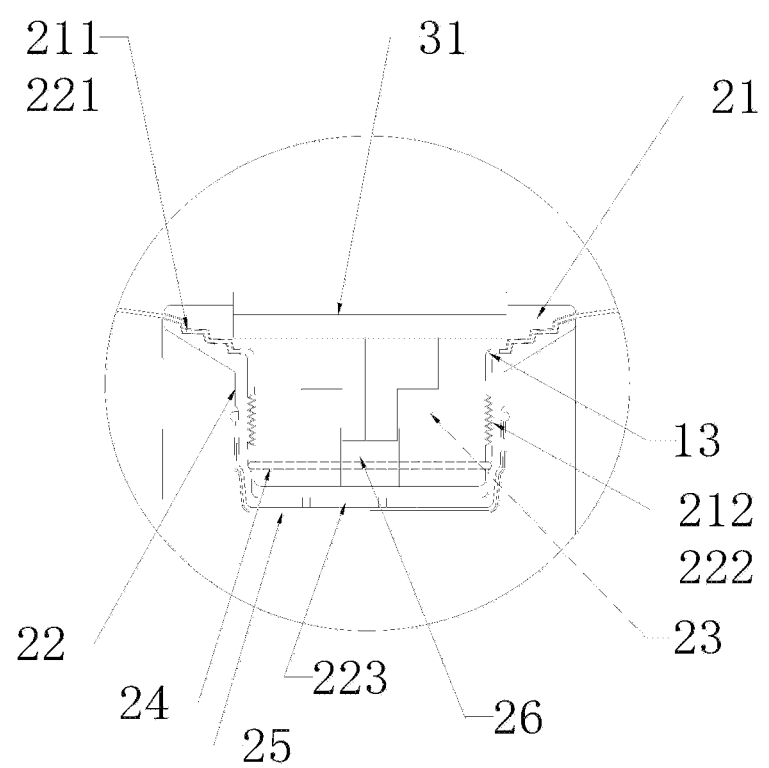
FIG. 3 is a partial enlarged view of Embodiment 1 of a B-direction view of FIG. 2.

Referring to FIGS. 1 to 3, an inflatable paddle board provided by Embodiment 1 of the present invention includes an inflatable paddle board body 10, an air pressure detection device 20, and an air pressure display device 30. The inflatable paddle board body 10 is a conventional inflatable paddle board, and includes a streamlined paddle board body 11 made of an ordinary PVC material or a preferred wire drawing material, one or more gas valves 12 disposed on the surface of the board body 11, and one or more tail fins (not shown) disposed at the tail of the bottom surface of the board body 11, as well as other features which ordinary inflatable paddle boards have.

The air pressure detection device 20 is configured to detect air pressure in an air chamber of the inflatable paddle board body 10 and transmit detected air pressure information. The air pressure detection device 20 includes a casing embedded in an open hole 13 of the inflatable paddle board body 10. The casing includes an upper casing 21 and a lower casing 22, and an accommodating cavity 23 is formed in the upper casing 21; one end of the lower casing 22 is open and sleeves the upper casing 21; the lower surface of the edge of the upper casing 21 and the upper surface of the open edge of the lower casing 22 are oppositely provided with step-shaped structure 211 and 221 meshing with each other; the edges of both the upper casing 21 and the lower casing 22 are matched with each other to clamp a material piece around the open hole 13; the periphery of the edge of the upper casing 21 is in sealing and connection with the inflatable paddle board body 10; the upper casing 21 and the lower casing 22 are fixedly connected with each other through an internal thread 212 disposed on the lower portion of the upper casing 21 and an external thread 222 correspondingly disposed on the lower casing 22, and a plurality of through holes 223 are disposed at the bottom of the lower casing 22 or around the lower casing 22; and filter screens 25 corresponding to the through holes 223 are fixedly disposed on the lower casing 22. An air pressure sensitive element configured to sense the air pressure is fixedly disposed in the accommodating cavity 23, and a ventilation pipe 26 connected with the through holes and the air pressure sensitive element is also disposed in the accommodating cavity 23, to form a channel for guiding gas in the air chamber to the air pressure sensitive element. A sealing gasket 24 is also disposed between the upper casing 21 and the lower casing 22. The air pressure display device 30 is configured to receive and display the air pressure information detected by the air pressure detection device 20.

In this embodiment, the air pressure display device 30 is mechanically connected with the air pressure detection device 20; the air pressure detection device 20 and the air pressure display device 30 form an integrated mechanical air pressure meter; the air pressure sensitive element is an internal structure of the integrated mechanical air pressure meter, and a dial plate 31 of the integrated mechanical air pressure meter is exposed out of the upper casing 21 and is in sealing and connection with the upper casing 21. The integrated mechanical air pressure meter is in the form of a common air pressure meter, and the air pressure sensitive element is an elastic sensitive element such as a spring tube or a diaphragm. In order to be suitable for a scenario of underwater use, the integral mechanical air pressure meter used in this embodiment should have a protection level of at least IPX-7.

Figure 4:
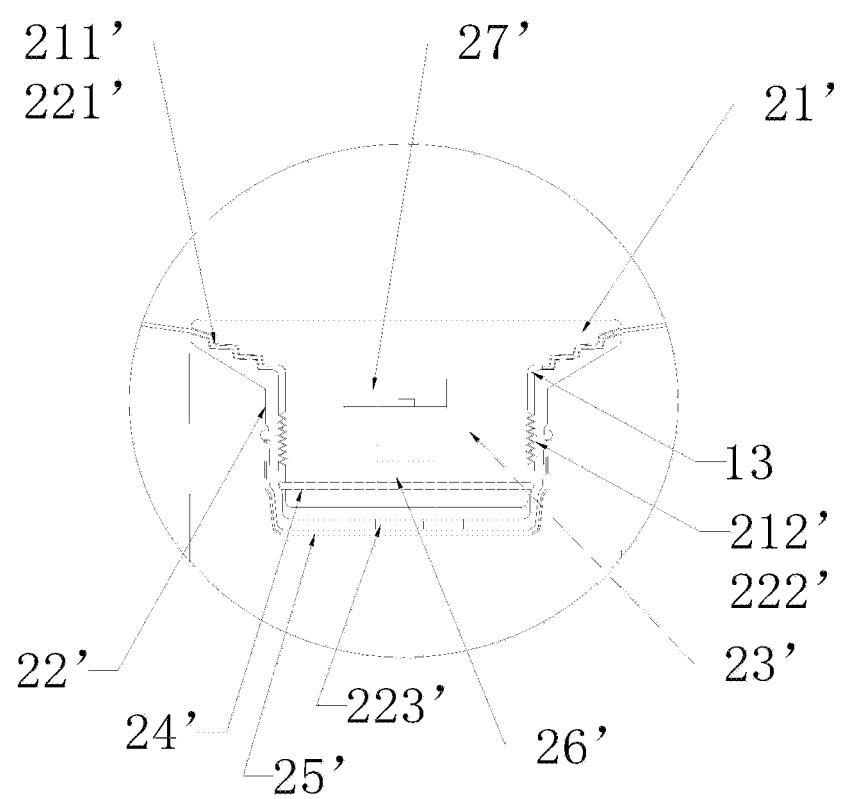
FIG. 4 is a partial enlarged view of Embodiment 2 of a B-direction view of FIG. 2.
Figure 5:
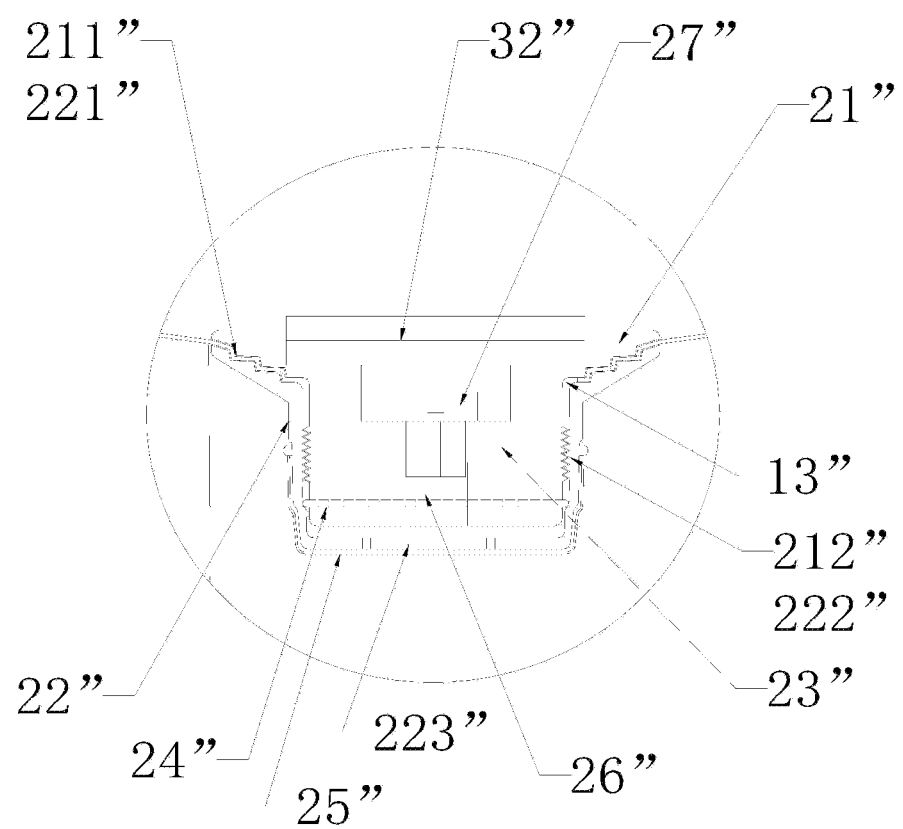
FIG. 5 is a partial enlarged view of Embodiment 2 of a B-direction view of FIG. 3.

Referring to FIGS. 1 to 2 and 4, the present invention also discloses another embodiment which is Embodiment 2. Embodiment 2 differs from Embodiment 1 in that an air pressure display device 30' (not shown) includes a receiving module 31' and a display screen 32'; an air pressure sensitive element is an air pressure sensor 27', and the receiving module 31' is configured to establish a communication connection with the air pressure sensor 27'. When the communication connection between the two is a wireless connection, the air pressure display device 30' and an air pressure detection device 20' are in split type arrangement. As shown in FIG. 4, a ventilation pipe 26' is connected with the through holes 223' and the air pressure sensitive element 27', to form a channel for guiding gas in the air chamber to the air pressure sensitive element. The air pressure display device 30' in this embodiment is a mobile phone or a smart watch, which can display the air pressure condition within the signal transmission range of the air pressure sensor 27'. In practical applications, the air pressure display device 30' may also be an ordinary device with the receiving module 31' and the display screen 32', and is fixedly disposed at an easily-viewed position of an inflatable paddle board body 10'. The structure of the air pressure detection device 20' in Embodiment 2 is similar to that in FIG. 1, and will not be repeated herein.

When the connection between the air pressure detection device and the air pressure display device is a communication connection, except for a wireless connection shown in Embodiment 2, the case where both are in wired connection is shown in Embodiment 3. At this time, similar to the arrangement of the integrated mechanical air pressure meter in Embodiment 1, an air pressure display device 30" and an air pressure sensor 27" are both fixedly disposed in an accommodating cavity 23", and a display screen 32" is exposed out of the upper surface of the casing and is in sealing and connection with the casing. The rest of the structure of an air pressure detection device 20" is the same as an implementation displayed in Embodiment 2, and will not be repeated herein.

When the inflatable paddle board provided by the present invention is used, the air pressure of the inflatable paddle board can be conveniently viewed at any time through the dial plate fixedly disposed on the inflatable paddle board, the display screen or the mobile phone carried around, so that the abnormality conditions of air pressure of the inflatable paddle board can be found in time, and a response is made to improve the safety of use of the inflatable paddle board.

We claim:

1. An inflatable paddle board, comprising an inflatable paddle board body, wherein the inflatable paddle board also comprises an air pressure detection device and an air pressure display device, wherein:
    the air pressure detection device is configured to detect air pressure in an air chamber of the inflatable paddle board body and transmit detected air pressure information;
    the air pressure detection device comprises a casing embedded in an open hole of the inflatable paddle board body, and an accommodating cavity is formed in the casing;
    the periphery of the casing is in sealing and connection with the inflatable paddle board body, and a portion of the casing extending into the air chamber is provided with a plurality of through holes;
    an air pressure sensitive element configured to sense the air pressure is fixedly disposed in the accommodating cavity, and a ventilation pipe connected with the through holes and the air pressure sensitive element is also disposed in the accommodating cavity, to form a channel for guiding gas in the air chamber to the air pressure sensitive element;
    the air pressure display device is configured to receive and display the air pressure information detected by the air pressure detection device;
    the casing comprises an upper casing and a lower casing, and the accommodating cavity is formed in the upper casing;
    one end of the lower casing is open and sleeves the upper casing;
    the lower surface of the edge of the upper casing and the upper surface of the open edge of the lower casing are oppositely provided with corresponding cascading multi-step-shaped structures meshing with each other;
    the edges of both the upper casing and the lower casing are matched with each other to clamp a material piece around the open hole;
    the periphery of the edge of the upper casing is in sealing and connection with the inflatable paddle board body;
    the upper casing and the lower casing are fixedly connected with each other through an internal thread disposed on the lower portion of the upper casing and an external thread correspondingly disposed on the lower casing; and
    the plurality of through holes are disposed around or at the bottom of the lower casing.

2. The inflatable paddle board according to claim 1, wherein the through holes each extend along a vertical axial direction, and wherein the through holes are disposed along a horizontal plane which intersects all of the through holes.

3. The inflatable paddle board according to claim 1, wherein:
    the air pressure display device is mechanically connected with the air pressure detection device;
    the air pressure display device and the air pressure detection device form an integrated mechanical air pressure meter;
    the air pressure sensitive element is an internal structure of the integrated mechanical air pressure meter; and
    a dial plate of the integrated mechanical air pressure meter is exposed out of the casing and is in sealing and connection with the casing.

4. The inflatable paddle board according to claim 1, wherein:
    the air pressure display device comprises a receiving module and a display screen;
    the air pressure sensitive element is an air pressure sensor; and
    the receiving module is configured to establish a communication connection with the air pressure sensor.

5. The inflatable paddle board according to claim 4, wherein:
- the communication connection between the receiving module and the air pressure sensor is a wired connection;
- the receiving module and the display screen are disposed in the accommodating cavity; and
- the display screen is exposed out of the upper surface of the casing and is in sealing and connection with the casing.

6. The inflatable paddle board according to claim 4, wherein:
- the communication connection between the receiving module and the air pressure sensor is a wireless connection; and
- the air pressure display device and the air pressure detection device are in split type arrangement.

7. An inflatable paddle board, comprising an inflatable paddle board body, wherein the inflatable paddle board also comprises an air pressure detection device and an air pressure display device, wherein:
- the air pressure detection device is configured to detect air pressure in an air chamber of the inflatable paddle board body and transmit detected air pressure information;
- the air pressure detection device comprises a casing embedded in an open hole of the inflatable paddle board body, and an accommodating cavity is formed in the casing;
- the periphery of the casing is in sealing and connection with the inflatable paddle board body, and a portion of the casing extending into the air chamber is provided with a plurality of through holes;
- an air pressure sensitive element configured to sense the air pressure is fixedly disposed in the accommodating cavity, and a ventilation pipe connected with the through holes and the air pressure sensitive element is also disposed in the accommodating cavity, to form a channel for guiding gas in the air chamber to the air pressure sensitive element;
- the air pressure display device is configured to receive and display the air pressure information detected by the air pressure detection device;
- the communication connection between the receiving module and the air pressure sensor is a wireless connection;
- the air pressure display device and the air pressure detection device are in split type arrangement; and
- the air pressure display device is a mobile phone or a smart watch.

8. The inflatable paddle board according to claim 1, wherein a sealing gasket is also disposed between the upper casing and the lower casing.

9. The inflatable paddle board according to claim 1, wherein the through holes are correspondingly provided with filter screens.

10. The inflatable paddle board according to claim 1, wherein the inflatable paddle board is made of a drop stitch material.

* * * * *